(12) United States Patent
Nichols et al.

(10) Patent No.: US 11,096,329 B2
(45) Date of Patent: Aug. 24, 2021

(54) CROP CONDITIONER HOOD WITH INTEGRATED SWATHBOARD

(71) Applicant: DEERE & COMPANY, Moline, IL (US)

(72) Inventors: Thomas A. Nichols, Eldon, IA (US); Lance T. Frahm, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 221 days.

(21) Appl. No.: 16/427,645

(22) Filed: May 31, 2019

(65) Prior Publication Data
US 2020/0375112 A1 Dec. 3, 2020

(51) Int. Cl.
| | |
|---|---|
| *A01D 82/00* | (2006.01) |
| *A01D 34/66* | (2006.01) |
| *A01D 41/06* | (2006.01) |
| *A01D 43/10* | (2006.01) |
| *A01D 57/24* | (2006.01) |
| *A01D 57/26* | (2006.01) |

(52) U.S. Cl.
CPC ........... *A01D 82/00* (2013.01); *A01D 34/667* (2013.01); *A01D 41/06* (2013.01); *A01D 43/10* (2013.01); *A01D 57/24* (2013.01); *A01D 57/26* (2013.01); *A01D 43/102* (2013.01)

(58) Field of Classification Search
CPC ...... A01D 82/00; A01D 41/06; A01D 34/667; A01D 43/10; A01D 57/24; A01D 57/26; A01D 43/102
See application file for complete search history.

(56) References Cited

U.S. PATENT DOCUMENTS

| | | | | |
|---|---|---|---|---|
| 3,699,755 | A | * 10/1972 | Hauser | ................. A01D 43/102 56/16.4 R |
| 4,182,099 | A | * 1/1980 | Davis | .................. A01D 43/102 56/16.4 R |

(Continued)

FOREIGN PATENT DOCUMENTS

| | | | | |
|---|---|---|---|---|
| EP | 0835603 | A2 * | 4/1998 | ........... A01D 43/102 |
| EP | 0965260 | A1 * | 12/1999 | ........... A01D 43/102 |

(Continued)

OTHER PUBLICATIONS

European Search Report issued in counterpart application No. 20176874.4 dated Oct. 29, 2020 (12 pages).

*Primary Examiner* — Arpad Fabian-Kovacs

(57) ABSTRACT

A harvesting apparatus includes a crop conditioning element and an associated hood for conditioning crop material. The hood is moveably mounted to a frame of the harvesting apparatus, at a position located above the crop conditioning element. The hood is moveably mounted to the frame for movement toward and away from the crop conditioning element to adjust a gap therebetween. A swathboard is attached to and moveable with the hood. The swathboard is moveable relative to the hood between a plurality of operating positions. The swathboard is operable to maintain its position relative to the hood during movement with the hood toward and away from the crop conditioning element to form a consistent swath while moving the hood relative to the crop conditioning element to adjust the gap therebetween.

15 Claims, 6 Drawing Sheets

(56) References Cited

U.S. PATENT DOCUMENTS

| | | | | |
|---|---|---|---|---|
| 4,233,803 | A | * | 11/1980 | Davis .................. A01D 43/102 56/14.9 |
| 4,539,798 | A | * | 9/1985 | Klinner ............... A01D 43/102 56/16.4 R |
| 4,720,962 | A | * | 1/1988 | Klinner ............... A01D 43/102 460/105 |
| 5,966,913 | A | * | 10/1999 | Neuerburg ........... A01D 43/102 56/16.4 A |
| 6,453,654 | B1 | | 9/2002 | Kraus et al. |
| 7,555,886 | B2 | | 7/2009 | Gradoz et al. |
| 8,166,740 | B2 | * | 5/2012 | Eubanks .............. A01D 43/102 56/504 |
| 8,458,997 | B2 | * | 6/2013 | Walch ................... A01D 43/10 56/16.4 R |
| 2007/0068130 | A1 | * | 3/2007 | Wilhelm ............. A01D 43/102 56/192 |
| 2008/0120956 | A1 | * | 5/2008 | Gradoz ................. A01D 43/10 56/157 |
| 2012/0090288 | A1 | | 4/2012 | Walch et al. |
| 2019/0261567 | A1 | * | 8/2019 | Faust ..................... A01D 82/00 |
| 2020/0029503 | A1 | * | 1/2020 | Nielsen ................. A01D 82/00 |
| 2020/0253125 | A1 | * | 8/2020 | Vittetoe ................ A01D 43/10 |

FOREIGN PATENT DOCUMENTS

| | | | |
|---|---|---|---|
| EP | 1692931 | A1 | 8/2006 |
| EP | 3315009 | A1 | 5/2018 |
| FR | 2107042 | A5 | 5/1972 |
| FR | 2855012 | A1 | 11/2004 |

\* cited by examiner

CROP CONDITIONER HOOD WITH INTEGRATED SWATHBOARD

FIELD OF THE DISCLOSURE

The present disclosure generally relates to a harvesting apparatus for an agricultural machine, and more particularly to a crop conditioning system for the harvesting apparatus.

BACKGROUND OF THE DISCLOSURE

A harvesting apparatus is coupled to an agricultural machine, and is used to cut and condition crop material, such as but not limited to hay and forage. The harvesting apparatus may be attached to a forward end of the agricultural machine, such as a windrower, which pushes the harvesting apparatus. In other embodiments, the harvesting apparatus may be attached to a rearward end of the agricultural machine, such as a tractor, which pulls the harvesting apparatus.

The harvesting apparatus includes a crop conditioning system that conditions the cut crop material. As used herein, "crop conditioning" or "conditioned crop material" includes processing the cut crop material to bend, crimp, and/or crack open stem and stalk portions of the cut crop material, and at least partially remove a wax material from the cut crop material, for the purpose of releasing moisture from the cut crop material and reducing dry-down time of the crop material. Once the crop conditioning system has conditioned the cut crop material, a swathboard at least partially forms the crop material into a swath having a desired width and/or depth.

SUMMARY OF THE DISCLOSURE

According to an aspect of the present disclosure, a harvesting apparatus for an agricultural machine is provided. The harvesting apparatus includes a frame, and a cutting mechanism that is coupled to the frame. The cutting mechanism is operable to cut crop material. The harvesting apparatus further includes a crop conditioning system. The crop conditioning system includes a crop conditioning element and an associated hood. The crop conditioning element is coupled to the frame, and is positioned relative to the frame at a location rearward of the cutting mechanism. The crop conditioning element receives the cut crop material from the cutting mechanism. The crop conditioning element is operable to condition the cut crop material. The hood is moveably mounted to the frame, at a position located above the crop conditioning element. The hood is moveably mounted to the frame for movement toward and away from the crop conditioning element to adjust a gap therebetween, which affects an amount or degree of crop conditioning between the hood and the crop conditioning element. A swathboard is attached to and moveable with the hood. The swathboard is positioned relative to the frame at a location rearward of the hood, forms the cut crop material from the crop conditioning system into a swath. The swathboard is operable to maintain a operating position relative to the hood during movement with the hood toward and away from the crop conditioning element.

In one aspect of the disclosure, the swathboard is rotatably attached to the hood for movement about a swathboard axis. The swathboard moves about the swathboard axis, between a plurality of operating positions relative to the hood. The swathboard is moveable relative to the hood between the plurality of operating positions to change a shape of the swath. When disposed in each respective one of the plurality of operating positions, the swathboard is operable to maintain its position relative to the hood during movement with the hood toward and away from the crop conditioning element. Accordingly, regardless of which one of the plurality of operating positions the swathboard is positioned in, the swathboard maintains that operating position relative to the hood during movement with the hood toward and away from the crop conditioning element. As such, when an operator positions the swathboard in a respective one of the operating positions that provides a desired shape for the swath, movement of the hood toward or away from the crop conditioning element to change the gap therebetween does not change the relative position of the swathboard, such that the shape of the swath remains constant. In other words, because the relative position between the hood and the swathboard remains constant while moving the hood, the position of the hood may be adjusted without affecting the shape of the swath.

In one aspect of the disclosure, an adjustment mechanism is attached to and moveable with the hood. The adjustment mechanism is coupled to the swathboard, and is operable to rotate the swathboard relative to the hood and about the swathboard axis between each of the plurality of operating positions.

In one aspect of the disclosure, the adjustment mechanism includes a handle that is rotatable about a handle axis. A support bracket interconnects the hood and the handle. The support bracket is fixedly attached to the hood and rotatably supports the handle. A position plate is attached to and moveable with the hood. The position plate defines a plurality of notches, with the handle engaged with a respective one of the plurality of notches to position the swathboard in a respective one of the plurality of operating positions.

In one aspect of the disclosure, the adjustment mechanism includes a connecting link that extends between and interconnects the handle and the swathboard. The connecting link is attached to the handle at an upper connection location, which is radially offset from the handle axis. The connecting link is attached to the swathboard at a lower connection location, which is radially offset from the swathboard axis. Because the upper connection location is radially offset from the handle axis, thereby forming an eccentric connection, rotation of the handle generates linear movement of the connecting link. Because the lower connection location is radially offset from the swathboard axis, thereby forming an eccentric connection, linear movement of the connecting link generates rotation of the swathboard about the swathboard axis, which moves the swathboard, relative to the hood, between the plurality of operating positions.

In one aspect of the disclosure, an actuating system interconnects the frame and the hood. The actuating system is controllable to move the hood toward and away from the crop conditioning element. In one exemplary embodiment, the actuating system includes a multiple linkage system having a plurality of links interconnect the hood, the frame, and each other, for moving the hood.

The above and other features will become apparent from the following description and accompanying drawings.

BRIEF DESCRIPTION OF THE DRAWINGS

The detailed description of the drawings refers to the accompanying figures.

DETAILED DESCRIPTION OF THE DRAWINGS

Figure 1:
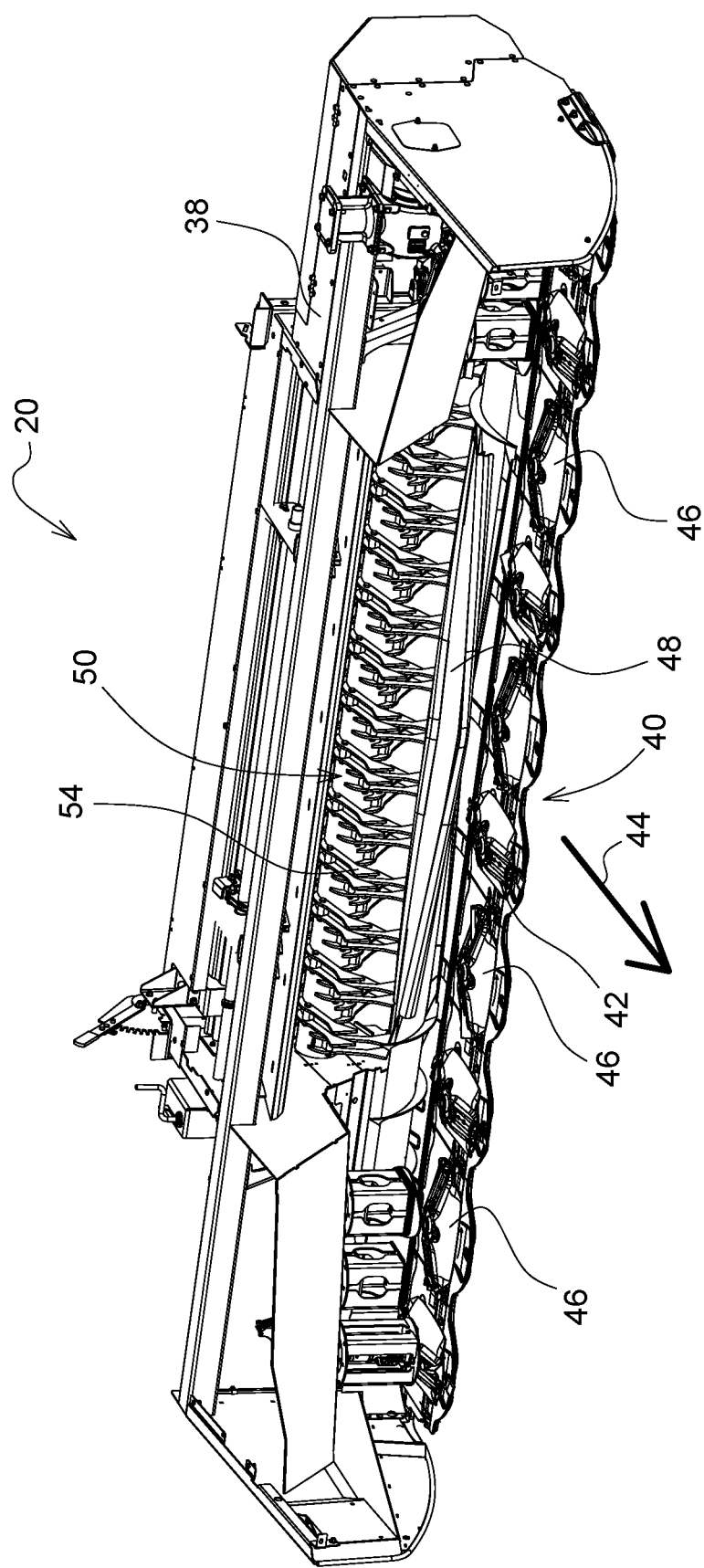
FIG. 1 is a schematic perspective view of a harvesting apparatus.
Figure 2:
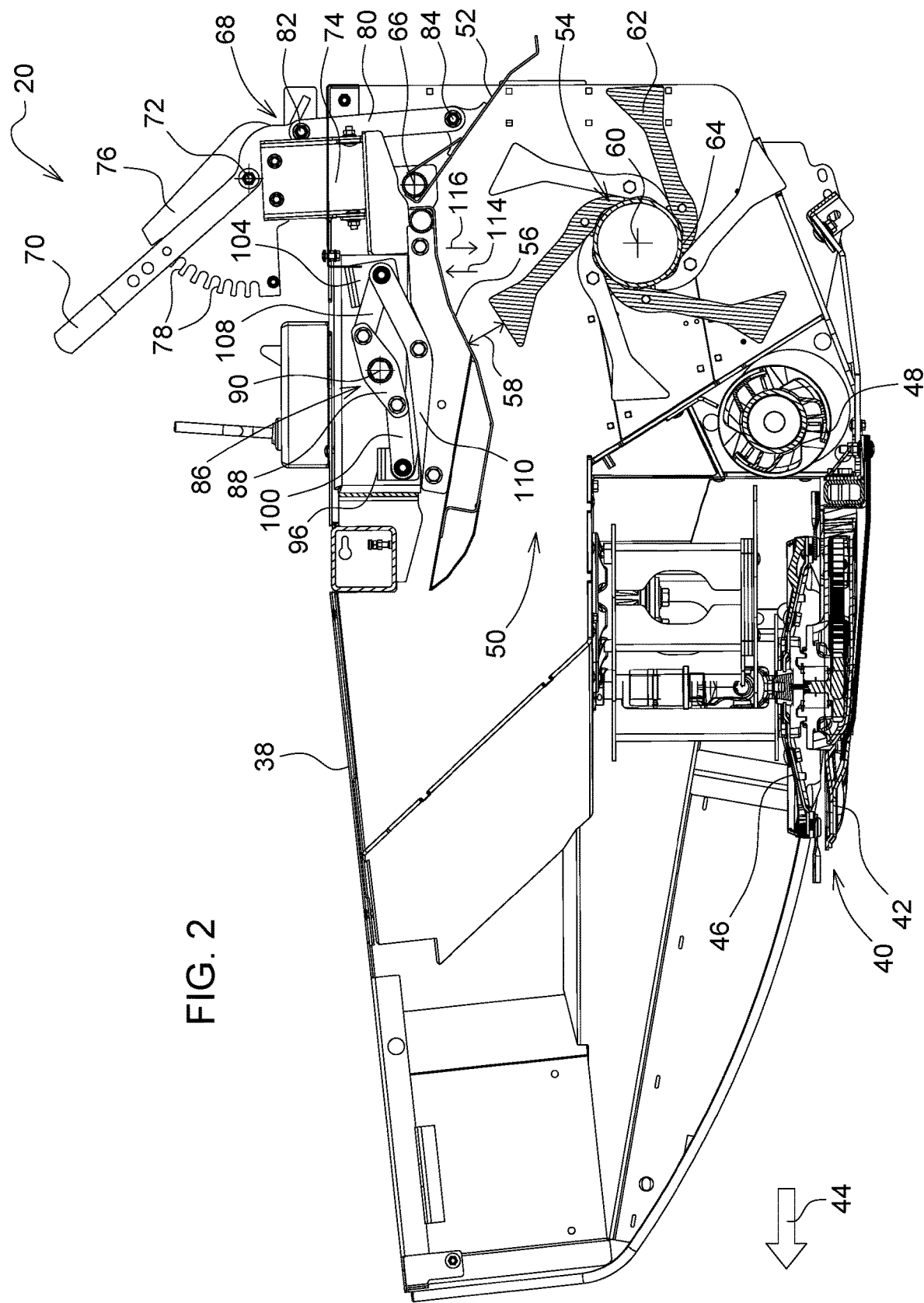
FIG. 2 is a schematic side cross sectional view of the harvesting apparatus showing a hood in a first position relative to a crop conditioning element, and a swathboard in a first operating position relative to the hood.
Figure 3:
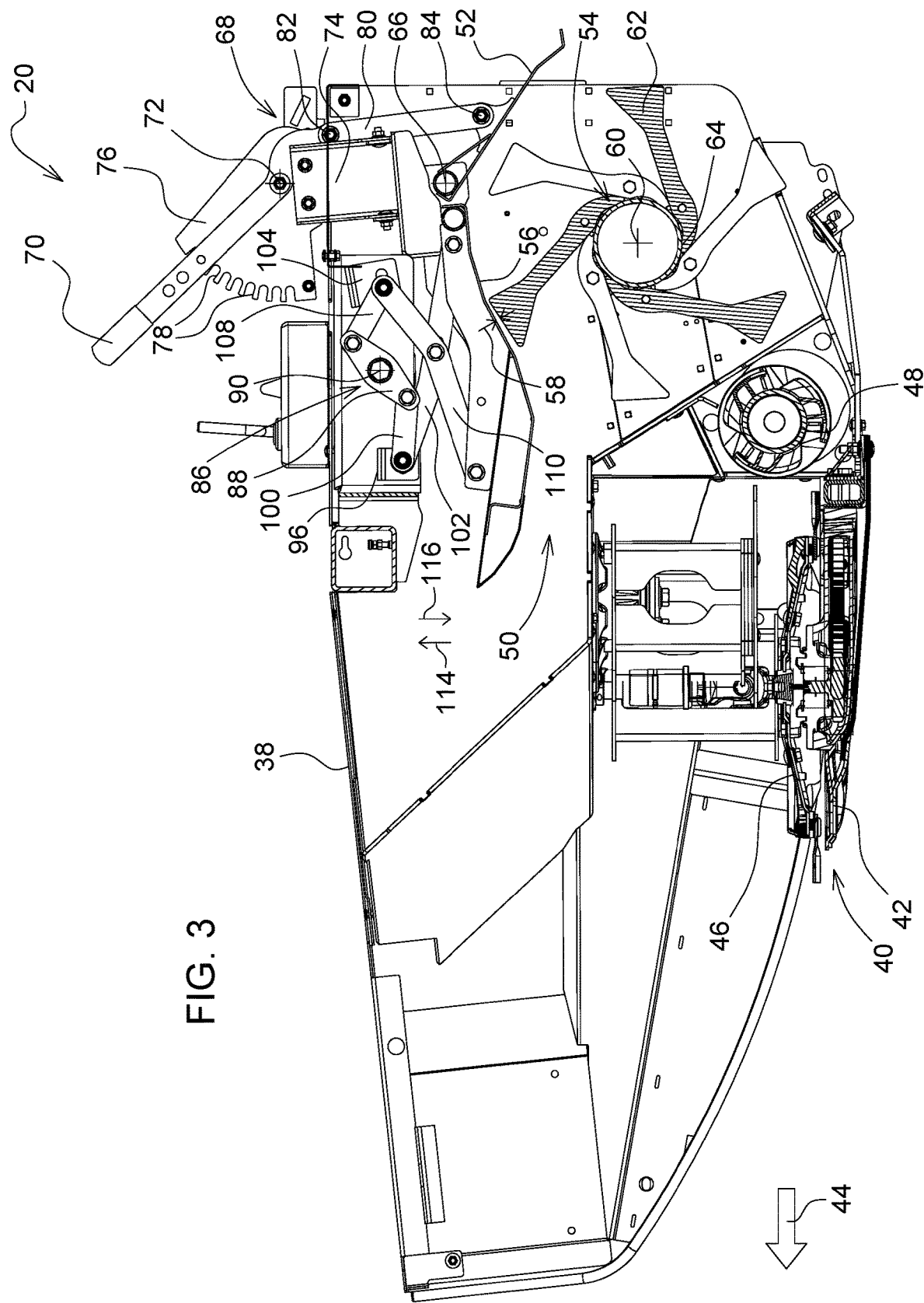
FIG. 3 is a schematic side cross sectional view of the harvesting apparatus showing the hood in a second position relative to the crop conditioning element, and the swathboard in the first operating position relative to the hood.
Figure 4:
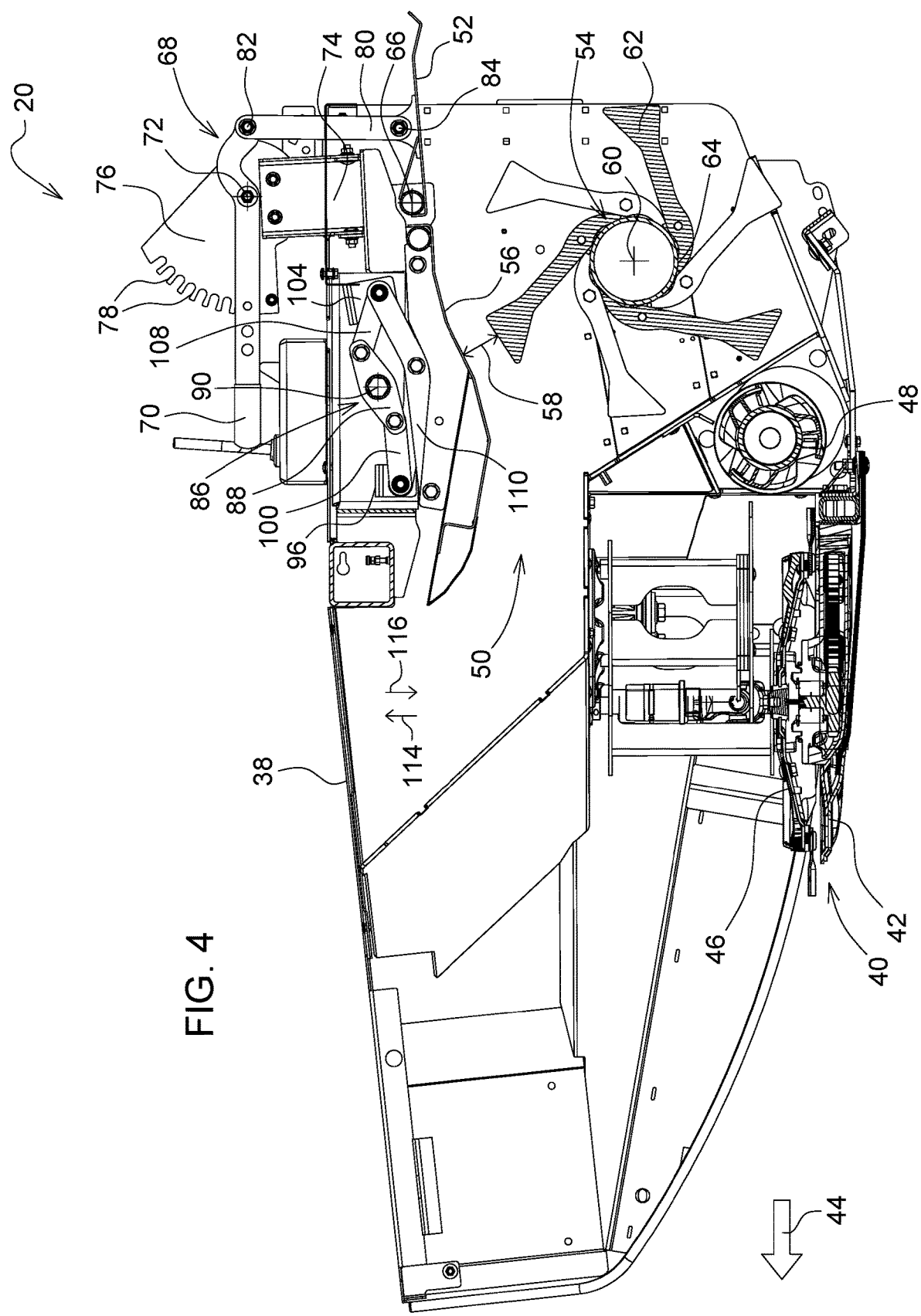
FIG. 4 is a schematic side cross sectional view of the harvesting apparatus showing the hood in the first position relative to the crop conditioning element, and the swathboard in a second operating position relative to the hood.
Figure 5:
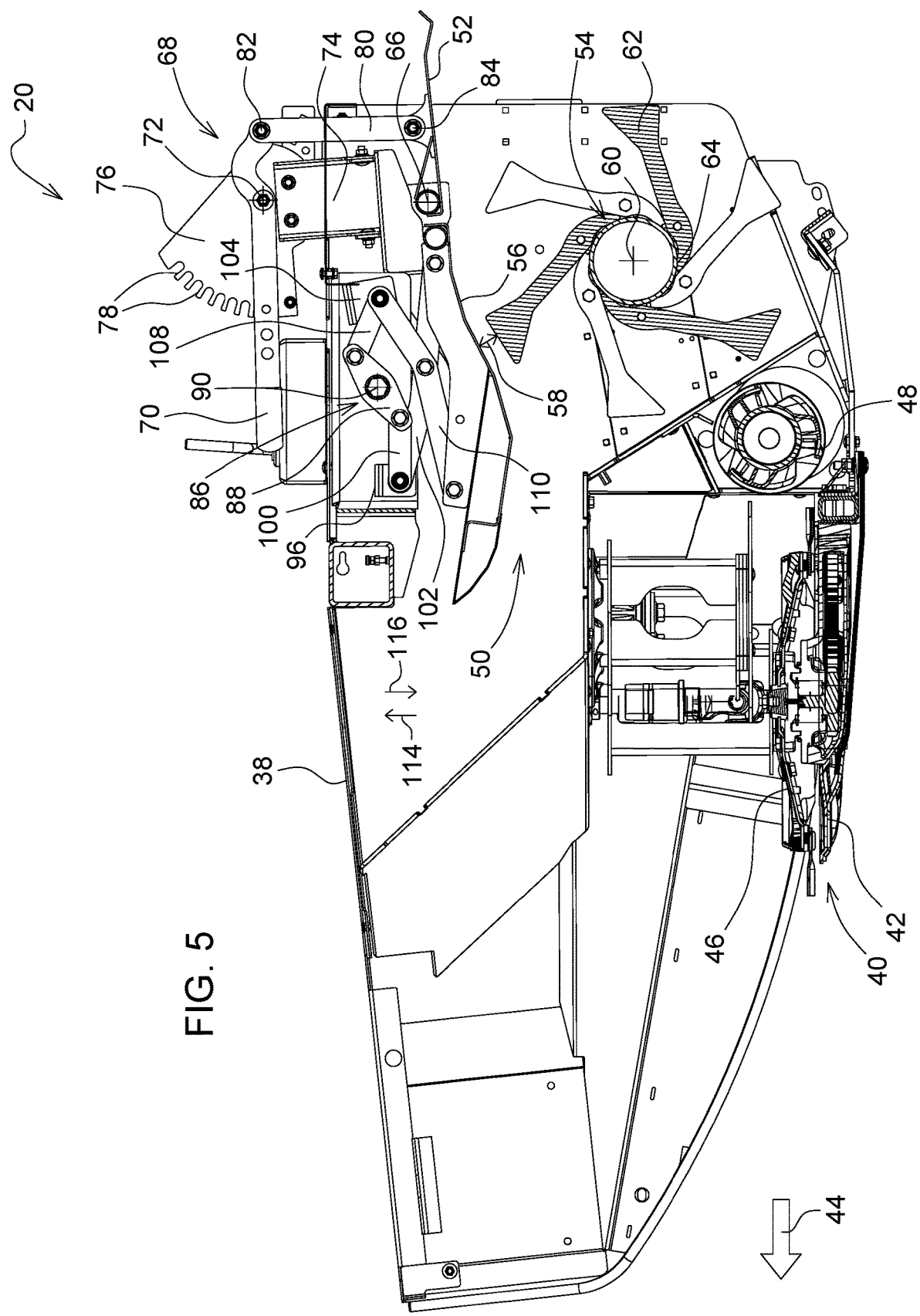
FIG. 5 is a schematic side cross sectional view of the harvesting apparatus showing the hood in the second position relative to the crop conditioning element, and the swathboard in the second operating position relative to the hood.

Those having ordinary skill in the art will recognize that terms such as "above," "below," "upward," "downward," "top," "bottom," "right," "left," etc., are used descriptively for the figures, and do not represent limitations on the scope of the disclosure, as defined by the appended claims.

Referring to the Figures, wherein like numerals indicate corresponding parts throughout the several views, a harvesting apparatus is generally shown at 20. The exemplary embodiment of the harvesting apparatus 20 shown in the Figures is configured for mounting to a forward end of an agricultural machine, such as a self-propelled windrower. However, it should be appreciated that the teachings of this disclosure may be applied to other platforms, such as but not limited to, the harvesting apparatus 20 being configured for connection to a conventional tractor, i.e., the harvesting apparatus 20 being a mower-conditioner drawn behind the tractor.

The harvesting apparatus 20 is operable to mow and collect standing crop material in a field, condition the cut crop material as it moves through the harvesting apparatus 20 to improve is drying characteristics, and then return the conditioned, cut crop material to the field in a windrow or swath.

Referring to FIGS. 2-5, the harvesting apparatus 20 includes a frame 38. The frame 38 may include, but is not limited to, the various members, panels, supports, braces, beams, etc., necessary to support the various components and systems of the harvesting apparatus 20 as described below. In one embodiment, the frame 38 may be attached to a forward end of the agricultural machine. In other embodiments, the frame 38 may be attached to the agricultural machine with a drawbar and drawn behind the agricultural machine.

The harvesting apparatus 20 further includes a cutting mechanism 40. The cutting mechanism 40 is coupled to the frame 38, and is operable to cut standing crop material in a field. The cutting mechanism 40 may include any mechanism that is capable of cutting the crop material. As shown in the Figures, the cutting mechanism 40 is embodied as a rotary disc cutter bar 42. However, the cutting mechanism 40 is not limited to the exemplary embodiment of the rotary disc cutter bar 42. As such, it should be appreciated that the cutting mechanism 40 may vary from the exemplary embodiment shown in the Figures and described herein.

The exemplary embodiment of the cutting mechanism 40 includes a cutter bar 42 supported by the frame 38. The cutter bar 42 extends along an axis that is disposed generally transverse to a direction of travel 44 of the harvesting apparatus 20. The cutter bar 42 includes a plurality of cutting discs 46 spaced along the cutter bar 42 for rotation about respective vertical axes. Each of the cutting discs 46 is coupled to an upright drive shaft to which power is coupled for causing them to rotate in appropriate directions, for delivering cut crop material to an auger 48 disposed rearward of the cutting mechanism 40.

Referring to FIGS. 2-5, the auger 48 is rotatably mounted to the frame 38, and passes in front of a crop conditioning system 50. In particular, the auger 48 is positioned in front of and lower than the crop conditioning system 50. The auger 48 includes a central cylindrical drum 64 with a central portion and outer ends. The outer ends of the auger 48 include flighting, and a plurality of fins is attached to the central portion. In operation, the design of the auger 48 enables the delivery of cut crop material into the crop conditioning system 50.

The cutting mechanism 40 delivers cut crop material to the auger 48, which in turn delivers the cut crop material rearward for further processing by the crop conditioning system 50. The conditioned crop material is expelled rearward by the crop conditioning system 50, and is formed into a windrow or swath by upright right and left forming panels and a swathboard 52.

The crop conditioning system 50 includes a crop conditioning element 54 and a hood 56 associated therewith. The hood 56 is disposed above the crop conditioning element 54 to form a gap 58 therebetween. The crop conditioning element 54 is coupled to the frame 38, and is positioned relative to the frame 38 at a location rearward of the cutting mechanism 40, relative to the direction of travel 44 of the harvesting apparatus 20, for receiving cut crop material from the cutting mechanism 40. As shown in the exemplary embodiment, the crop conditioning element 54 is embodied as a crop conditioning impeller. However, it should be appreciated that the crop conditioning element 54 may be embodied as some other device, such as abut not limited to a crop conditioning roll. The crop conditioning element 54 is rotatably driven in a clockwise direction, as viewed on the page of FIGS. 2-5, about an impeller axis 60. In the exemplary embodiment shown in the Figures and described herein, the crop conditioning element 54 (e.g., the impeller shown in the Figures) may be formed as an elongated cylindrical drum 64 having a plurality of tines 62 or arms coupled to the drum 64 at a radial distance from the impeller axis 60. In the exemplary embodiment shown in the Figures and described herein, each of the plurality of tines 62 is disposed substantially tangentially with respect to the cylindrical drum 64.

The crop conditioning element 54 may be coupled to the harvesting apparatus 20 rearward and upward relative to the auger 48. The crop conditioning element 54 is rotatably driven such that the cut crop material is received from the auger 48, and directed around the crop conditioning element 54, between the hood 56 and the crop conditioning element 54, thereby conveying and/or conditioning the crop. As noted above, the terms "crop conditioning" or "conditioned crop material" include the processing of cut crop material to bend, crimp, and/or crack open stem and stalk portions of the cut crop material, and at least partially remove a wax material from the cut crop material, for the purpose of releasing moisture from the cut crop material and reducing dry-down time of the crop material.

As noted above, the hood 56 is disposed above the crop conditioning element 54 to form the gap 58 between the hood 56 and the crop conditioning element 54. The hood 56 is moveably mounted to the frame 38 above the crop conditioning element 54 for movement relative to the crop conditioning element 54. The hood 56 is moveable toward and away from the crop conditioning element 54 for adjusting the gap 58 therebetween. As is understood by those skilled in the art, adjusting the gap 58 changes the amount of crop conditioning and/or the volume of cut crop material that may be processed. For example, increasing the gap 58 distance for a given volume of cut crop material decreases the friction between hood 56 and the crop conditioning element 54, which decreases the amount of crop conditioning. In contrast, decreasing the gap 58 distance for a given volume of cut crop material increases the friction between the hood 56 and the crop conditioning element 54, which increases the amount of crop conditioning. The gap 58 distance may further be adjusted to maintain a given amount of crop conditioning when the volume of cut material passing through the crop conditioning system 50 changes. For example, a higher volume of cut crop material may require that the gap 58 distance be increased to maintain a desired amount of crop conditioning, whereas as lower volume of cut crop material may require that the gap 58 distance be decreased to maintain a desired amount of crop conditioning.

The swathboard 52 is attached to and moveable with the hood 56. The swathboard 52 is shown in a first operating position relative to the hood 56 in FIGS. 2-3, and is shown in a second operating position in FIGS. 4-5. The swathboard 52 is attached to the hood 56 such that the swathboard 52 maintains a operating position relative to the hood 56 during movement with the hood 56 toward and away from the crop conditioning element 54. In the exemplary embodiment shown in the Figures and described herein, the swathboard 52 is rotatably attached to the hood 56 for movement about a swathboard axis 66, between a plurality of operating positions relative to the hood 56. The swathboard 52 is adjustable between the plurality of operating positions, relative to the hood 56, based on how the conditioned crop material is to be discharged rearwardly form the harvesting apparatus 20. For example, the swathboard 52 may be adjusted such that the conditioned crop material is discharged laterally rearwardly in a direction opposite the direction of travel 44 of the harvesting apparatus 20. In another example, the swathboard 52 may be adjusted such that the conditioned crop material is discharged rearwardly and downwardly toward the ground surface. The swathboard 52 may further be adjusted to discharge the conditioned crop material based on a desired width and/or depth of the windrow or swath.

When the swathboard 52 is disposed in any of the plurality of operating positions, the swathboard 52 maintains its position relative to the hood 56 during movement with the hood 56 toward and away from the crop conditioning element 54. Accordingly, because the swathboard 52 maintains its position relative to the hood 56 as the hood 56 moves relative to the crop conditioning element 54, the desired swath shape may be maintained while adjusting the gap 58 distance between the hood 56 and the crop conditioning element 54.

The crop conditioning system 50 includes an adjustment mechanism 68 attached to and moveable with the hood 56. The adjustment mechanism 68 is coupled to the swathboard 52, and is operable to rotate the swathboard 52 relative to the hood 56 and about the swathboard axis 66, between each of the plurality of operating positions. Because the adjustment mechanism 68 is attached to and moves with the hood 56, instead of the frame 38, the position of the swathboard 52 relative to the hood 56 remains constant as the hood 56 moves relative to the crop conditioning element 54.

The adjustment mechanism 68 may include a mechanism capable of controlling movement of the swathboard 52 relative to the hood 56 between the plurality of operating positions. An exemplary embodiment of the adjustment mechanism 68 is shown in the Figures and described herein. However, the it should be appreciated that the adjustment mechanism 68 may include a mechanism other than described herein. The exemplary embodiment of the adjustment mechanism 68 shown and described herein includes a handle 70 that is rotatable about a handle axis 72. A support bracket 74 interconnects the hood 56 and the handle 70. In other words, the support bracket 74 mounts the handle 70 to the hood 56. The support bracket 74 is fixedly attached to the hood 56 and rotatably supports the handle 70.

The adjustment mechanism 68 further includes a position plate 76. The position plate 76 is attached to and moveable with the hood 56. For example, the position plate 76 may be attached to the support bracket 74, which in turn connects the position plate 76 to the hood 56. Alternatively, the position plate 76 may be directly attached to the hood 56. The position plate 76 defines a plurality of notches 78. The handle 70 is positioned within and/or engages a respective one of the plurality of notches 78 to position the swathboard 52 in a respective one of the plurality of operating positions. Accordingly, it should be appreciated that moving the handle 70 into a different one of the plurality of notches 78, changes the operating position of the swathboard 52 relative to the hood 56.

The adjustment mechanism 68 includes a connecting link 80. The connecting link 80 extends between and interconnects the handle 70 and the swathboard 52. The connecting link 80 is attached to the handle 70 at an upper connection location 82, and is attached to the swathboard 52 at a lower connection location 84. The upper connection location 82 is radially offset from the handle axis 72 to form an eccentric connection relative to the handle axis 72. Due to the eccentricity of the upper connection location 82 relative to the handle axis 72, rotation of the handle 70 about the handle axis 72 generates linear movement of the connecting link 80. The lower connection location 84 is radially offset from the swathboard axis 66 to form an eccentric connection relative to the swathboard axis 66. Due to the eccentricity of the lower connection location 84 relative to the swathboard axis 66, linear movement of the connecting link 80 at the lower connection location 84 generates rotation of the swathboard 52 about the swathboard axis 66, which moves the swathboard 52, relative to the hood 56, between the plurality of operating positions.

The harvesting apparatus 20 further includes an actuating system 86 for moving the hood 56. The actuating system 86 interconnects the frame 38 and the hood 56. The actuating system 86 is controllable to move the hood 56 toward and away from the crop conditioning element 54. The hood 56 is shown in a fully raised, first position in FIGS. 2 and 4. The hood 56 is shown in a fully lowered, second position in FIGS. 3 and 5. It should be appreciated that the hood 56 may be positioned in an infinite number of positions between the first position and the second position shown in the Figures.

In the exemplary embodiment shown in the Figures and described herein, the actuating system 86 includes a multiple linkage system having a plurality of links interconnected for moving the hood 56. The linkage system may be actuated by an electric motor, hydraulic motor, hydraulic cylinders, or some other device capable of controlling movement of the linkage system.

Figure 6:
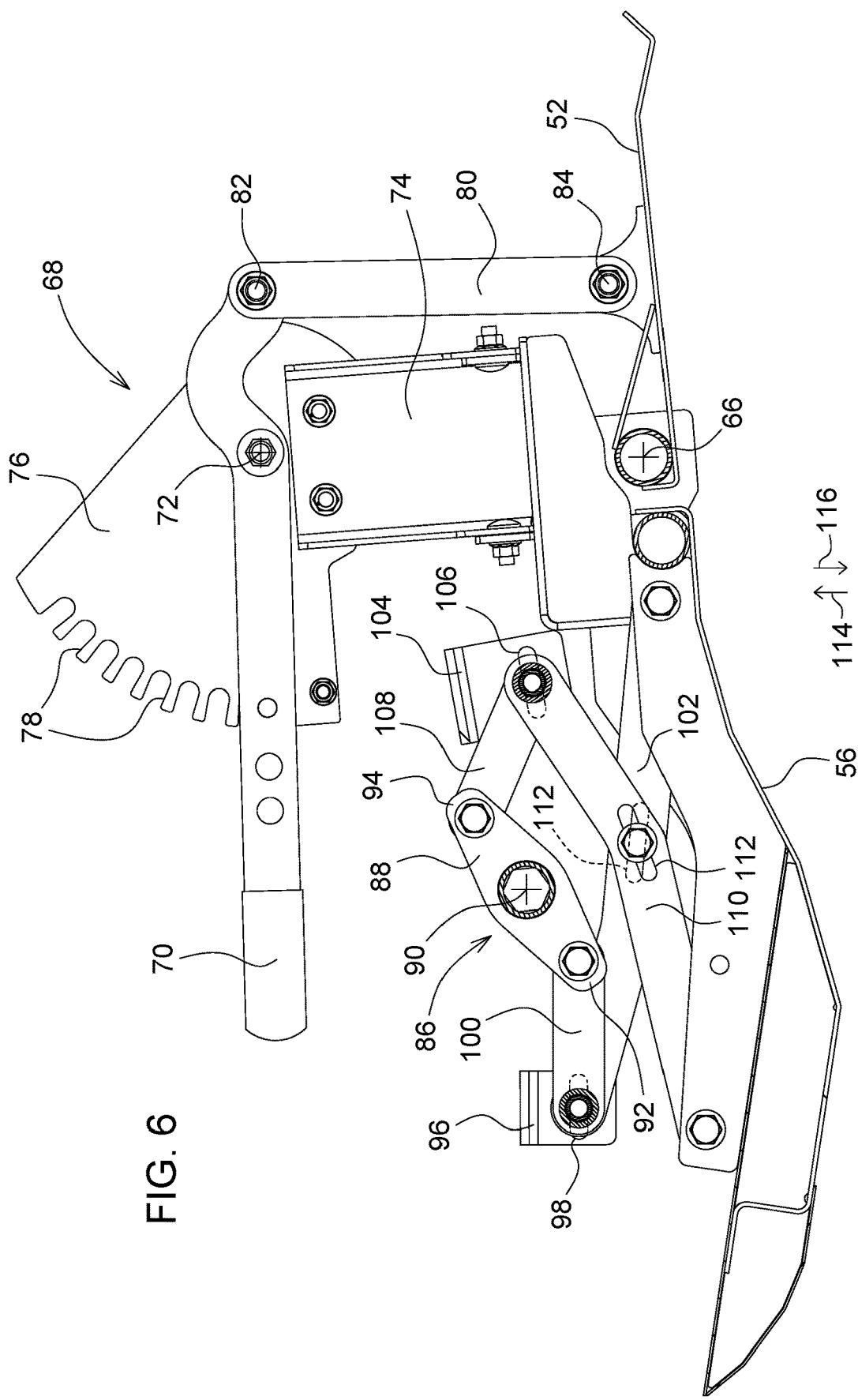
FIG. 6 is a schematic side view of an actuating system of the harvesting apparatus.

Referring to FIG. 6, the actuating system 86 includes an actuating arm 88 rotatable about a central axis 90. The actuating arm 88 includes a first end 92, and an opposing second end 94. The central axis 90 intersects the actuating arm 88 at an approximate midsection of the actuating arm 88, between the first end 92 and the second end 94. A first support block 96 is attached to the frame 38 forward of the actuating arm 88 relative to the direction of travel 44 of the harvesting apparatus 20. The first support block 96 defines a first slot 98. A first control link 100 is rotatably coupled to the first end 92 of the actuating arm 88. The first control ink is rotatably coupled to a first cross link 102 through the first slot 98 of the first control block. The first cross link 102 is rotatably coupled to the hood 56 at a location rearward of the actuating arm 88 relative to the direction of travel 44 of the harvesting apparatus 20.

A second support block 104 is attached to the frame 38 rearward of the actuating arm 88 relative to the direction of travel 44 of the harvesting apparatus 20. The second support block 104 defines a second slot 106. A second control link 108 is rotatably coupled to the second end 94 of the actuating arm 88. The second control ink is rotatably coupled to a second cross link 110 through the second slot 106 of the second control block. The second cross link 110 is rotatably coupled to the hood 56 at a location forward of the actuating arm 88 relative to the direction of travel 44 of the harvesting apparatus 20. The first cross link 102 and the second cross link 110 each include a respective central slot 112 disposed at an approximate midsection of the first cross link 102 and the second cross link 110 respectively. The first cross link 102 and the second cross link 110 are rotatably pinned together through their respective central slots 112.

Rotation of the actuating arm 88 about the central axis 90 in a clockwise direction as viewed on the page of FIG. 6 moves the first end 92 of the actuating arm 88 forward and the second end 94 of the actuating arm 88 rearward. This motion in turn moves the first control link 100 and the end of the first cross link 102 attached to the first control link 100 forward, and the second control ink and the end of the second cross link 110 attached to the second control link 108 rearward. This causes the first cross link 102 and the second cross link 110 to operate in a scissor motion, such that the hood 56 is raised in an upward direction indicated by arrow 114, and away from the crop conditioning element 54.

Rotation of the actuating arm 88 about the central axis 90 in a counter-clockwise direction as viewed on the page of FIG. 6 moves the first end 92 of the actuating arm 88 rearward and the second end 94 of the actuating arm 88 forward. This motion in turn moves the first control link 100 and the end of the first cross link 102 attached to the first control link 100 rearward, and the second control ink and the end of the second cross link 110 attached to the second control link 108 forward. This causes the first cross link 102 and the second cross link 110 to operate in a scissor motion, such that the hood 56 is lowered in a downward generally indicated by arrow 116, and toward the crop conditioning element 54.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A harvesting apparatus for an agricultural machine, the harvesting apparatus comprising:
   a frame;
   a cutting mechanism coupled to the frame and operable to cut crop;
   a crop conditioning element coupled to the frame and positioned relative to the frame at a location rearward of the cutting mechanism for receiving crop from the cutting mechanism;
   a hood moveably mounted to the frame above the crop conditioning element for movement toward and away from the crop conditioning element;
   an adjustment mechanism attached to and moveable with the hood;
   a swathboard attached to and moveable with the hood during movement of the hood toward and away from the crop conditioning element, wherein the swathboard is rotatably attached to the hood for movement about a swathboard axis relative to the hood between a plurality of operating positions of the swathboard; and
   wherein the adjustment mechanism includes a connecting link attached to the swathboard and operable to rotate the swathboard relative to the hood about the swathboard axis between each of the plurality of operating positions of the swathboard, wherein the connecting link is configured to maintain each of the plurality of operating positions of the swathboard relative to the hood during movement of the hood toward and away from the crop conditioning element.

2. The harvesting apparatus set forth in claim 1, wherein the adjustment mechanism includes a handle rotatable about a handle axis.

3. The harvesting apparatus set forth in claim 2, wherein the adjustment mechanism includes a support bracket interconnecting the hood and the handle, wherein the support bracket is fixedly attached to the hood and rotatably supports the handle.

4. The harvesting apparatus set forth in claim 2, wherein the connecting link extends between and interconnects the handle and the swathboard.

5. The harvesting apparatus set forth in claim 4, wherein the connecting link is attached to the handle at an upper connection location that is radially offset from the handle axis, and wherein the connecting link is attached to the swathboard at a lower connection location that is radially offset from the swathboard axis.

6. The harvesting apparatus set forth in claim 2, wherein the adjustment mechanism includes a position plate defining a plurality of notches, with the handle engaged with a respective one of the plurality of notches to position the swathboard in a respective one of the plurality of operating positions.

7. The harvesting apparatus set forth in claim 6, wherein the position plate is attached to and moveable with the hood.

8. The harvesting apparatus set forth in claim 1, further comprising an actuating system interconnecting the frame and the hood, wherein the actuating system is controllable to move the hood toward and away from the crop conditioning element.

9. The harvesting apparatus set forth in claim 8, wherein the actuating system includes a multiple linkage system having a plurality of links interconnected for moving the hood.

10. A crop conditioning system for a harvesting apparatus, the crop conditioning system comprising:
- a crop conditioning element;
- a hood moveable toward and away from the crop conditioning element to define a gap therebetween;
- an adjustment mechanism attached to and moveable with the hood;
- a swathboard attached to and moveable with the hood during movement of the hood toward and away from the crop conditioning element, wherein the swathboard is rotatably attached to the hood for movement about a swathboard axis relative to the hood between a plurality of operating positions of the swathboard;
- wherein the adjustment mechanism includes a connecting link attached to the swathboard and operable to rotate the swathboard relative to the hood about the swathboard axis between each of the plurality of operating positions of the swathboard, wherein the connecting link is configured to maintain each of the plurality of operating positions of the swathboard relative to the hood during movement of the hood toward and away from the crop conditioning element.

11. The crop conditioning system set forth in claim 10, wherein the adjustment mechanism includes a handle rotatable about a handle axis.

12. The crop conditioning system set forth in claim 11, wherein the adjustment mechanism includes a support bracket interconnecting the hood and the handle, wherein the support bracket is fixedly attached to the hood and rotatably supports the handle.

13. The crop conditioning system set forth in claim 11, wherein the connecting link extends between and interconnects the handle and the swathboard, wherein the connecting link is attached to the handle at an upper connection location that is radially offset from the handle axis, and wherein the connecting link is attached to the swathboard at a lower connection location that is radially offset from the swathboard axis.

14. The crop conditioning system set forth in claim 11, wherein the adjustment mechanism includes a position plate attached to and moveable with the hood, wherein the position plate defines a plurality of notches, with the handle engaged with a respective one of the plurality of notches to position the swathboard in a respective one of the plurality of operating positions.

15. A crop conditioning system for a harvesting apparatus, the crop conditioning system comprising:
- a crop conditioning element;
- a hood moveable toward and away from the crop conditioning element to define a gap therebetween;
- a swathboard attached to and moveable with the hood, wherein the swathboard is operable to maintain an operating position relative to the hood during movement with the hood toward and away from the crop conditioning element;
- wherein the swathboard is rotatably attached to the hood for movement about a swathboard axis between a plurality of operating positions relative to the hood;
- an adjustment mechanism attached to and moveable with the hood, wherein the adjustment mechanism is coupled to the swathboard and operable to rotate the swathboard relative to the hood and about the swathboard axis between each of the plurality of operating positions; and
- wherein the adjustment mechanism includes a handle rotatable about a handle axis, and a connecting link extending between and interconnecting the handle and the swathboard, wherein the connecting link is attached to the handle at an upper connection location that is radially offset from the handle axis, and wherein the connecting link is attached to the swathboard at a lower connection location that is radially offset from the swathboard axis.

\* \* \* \* \*